Sept. 2, 1969    R. J. WEIR ET AL    3,465,326
SPEED DETECTION

Filed May 4, 1966    3 Sheets-Sheet 1

Inventors
ROBERT JAMES WEIR
ANTHONY DAVID HEWITT
By Cushman, Darby & Cushman
Attorneys

United States Patent Office 3,465,326
Patented Sept. 2, 1969

3,465,326
SPEED DETECTION
Robert James Weir and Anthony David Hewitt, Norton-on-Tees, England, assignors to Imperial Chemical Industries Limited, London, England, a corporation of Great Britain
Filed May 4, 1966, Ser. No. 547,602
Claims priority, application Great Britain, July 26, 1965, 31,783
Int. Cl. G08b 5/22
U.S. Cl. 340—263                                  16 Claims

ABSTRACT OF THE DISCLOSURE

Method and apparatus for detecting the speed of a body moving with a recurring motion, for example a rotating shaft. A sensing device detects a sensible portion or a series of sensible portions on the body and generates pulses accordingly. A time interval between successive pulses is measured and compared with a standard time interval and significant departures from standard are identified.

---

This invention concerns speed detection.

According to the present invention a method of detecting the speed of a body moving with a recurring motion such as a rotating shaft, comprises disposing a pulse-generating sensing means relative to the path of said body such that it can sense a particular sensible portion or series of sensible portions of the body at a particular position in said path, measuring the time interval between successive pulses produced by the sensing means as a result of the sensing of a sensible portion, and comparing the measured time interval with a standard time interval.

The method may be applied to the speed detection of bodies moving in, for example, rotating and reciprocating motion although it is particularly applicable to the speed detection of rotating shafts. A preferred method of the invention is used for the detection of over-speed in shafts to enable corrective action to be taken quickly, thereby avoiding excessive damage to associated equipment.

The pulse generating sensing means may be of any conventional type, such as radiation and magnetically operated devices, but it is preferred to use a device as described in our co-pending British application No. 31,782/65. This device provides sharp reproducible pulses even at high speeds and thus enables the detection of the speed of fast moving bodies by the method of this invention.

The standard time interval is preferably produced by means of a crystal clock, which for high speed application should have a frequency of the order of 1 megacycle per second. The number of pulses produced by the clock between pulses produced by the sensing device will give a measure of the period of the shaft.

A method of detecting overspeed in rotating shafts as hereinafter described with reference to the accompanying drawing by way of illustration only.

The shaft is provided with two diametrically opposed sensible portions so that the sensing device will produce two pulses for each revolution of the shaft.

Figure 1:
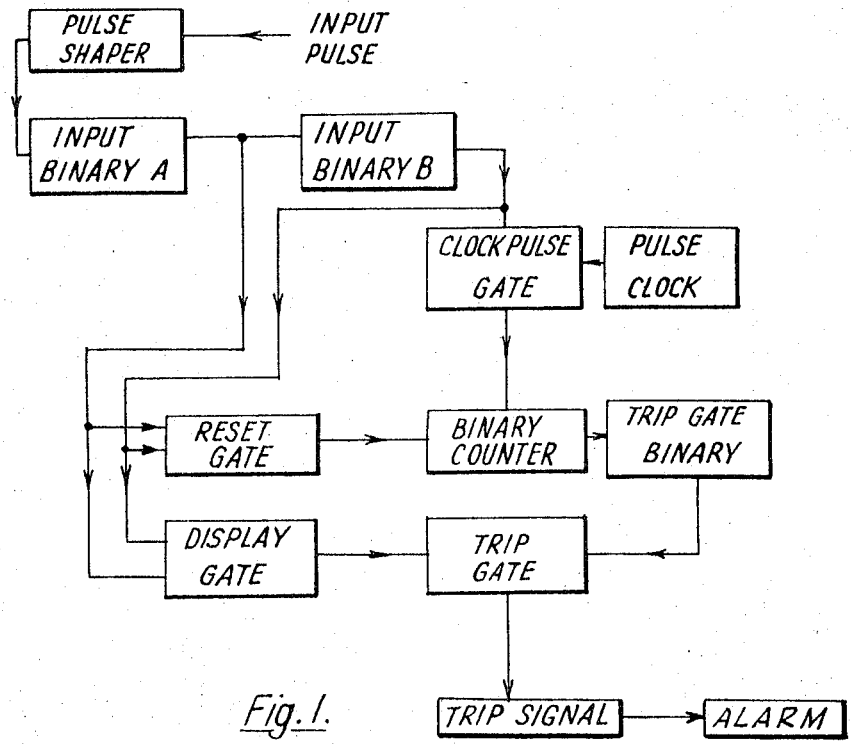
Figure 3:
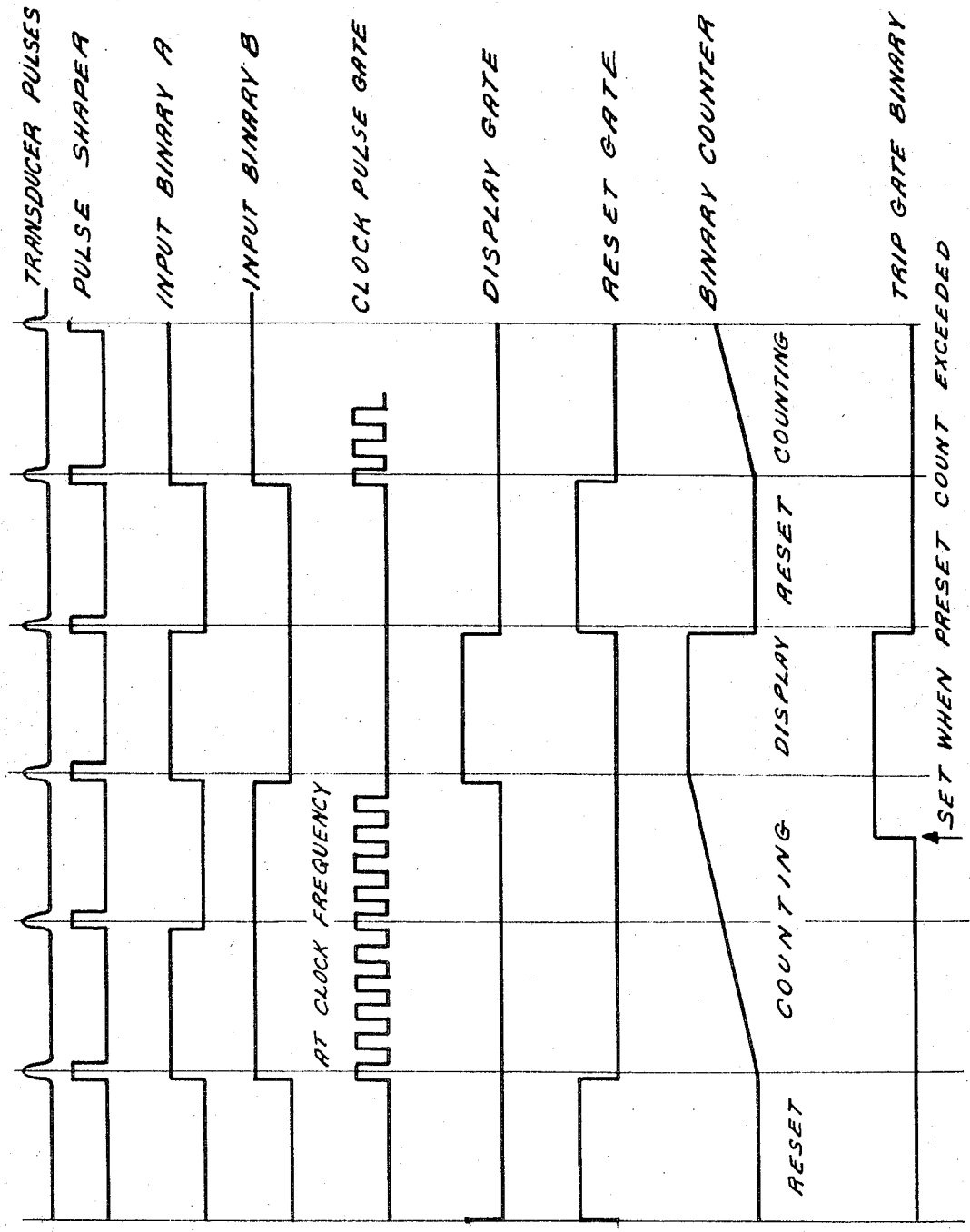

The basic circuitry is shown in FIGURE 1 of the accompanying drawing in the form of a block diagram and FIGURE 3 illustrates the waveforms occurring therein. The incoming pulses from the sensing device are first passed to a pulse shaper which produces a square wave pulse. The output from the pulse shaper is passed to an input binary, input binary A, which is operated by the first pulse and produces a pulse which is passed to input binary B. The next input pulse restores input binary A to its original state.

Thus, it will be seen that whilst binary A is switched by each incoming pulse, binary B is switched only by alternate pulses. These pulses, of course, originate from the same sensible portion on the shaft. This is important as the use of more than one sensible portion for actual speed measurement would introduce error due to the difficulty of ensuring that the sensible portions are distributed precisely.

In response to the pulse from binary A, the input binary B then produces a pulse which opens a clock pulse gate. This gate then allows pulses from the clock to be passed to a multi-stage binary counter which, for this particular application, has thirteen stages.

The counter is preset to a number which is the complement of the number of pulses which correspond to the acceptable period of the shaft, i.e. the shortest period at which the shaft is not considered to be running overspeed. When all stages of the counter are full, the next clock pulse will set the counter to the zero condition and produce a pulse to the following binary, a trip gate control binary. The counter will continue counting clock pulses until a second pulse is received from the input binary B which will close the clock pulse gate.

The outputs of both binary A and binary B are fed to a display gate and a reset gate. The display gate is such that an output pulse is produced only when binaries A and B are in the state to which they have been set by the arrival of the third pulse from the pulse shaper. This output pulse is passed to a trip gate which will act to produce a trip signal only if the trip gate has not been set by the trip gate control binary. This condition will occur when the multistage binary counter has not received sufficient clock pulses to be full, i.e. when the period of the shaft is shorter than the shortest period at which the shaft is not considered to be running overspeed.

The display gate also serves to connect the multistage counter to a visual display, this being effected at a time when the counter is stationary.

The arrival of the fourth pulse from the pulse shaper changes the state of binary A which closes the display gate and opens the reset gate. The reset unit then actuates the counter reset circuit which returns the multistage counter to its preset condition. The counter is then ready to receive the next input pulse from the input binary B.

It will be apparent that a trip signal can be produced only as a result of two revolutions of the shaft in an overspeed condition. This is due to the fact that the duration of the first revolution is devoted to counting clock pulses whilst the duration of the second revolution is devoted to interrogating and resetting the counter. The actual counting period is that between the arrival of consecutive pulses from a single sensible portion of the shaft, the intervening pulses from the other sensible portion being utilised to activate the trip gate and to operate the counter reset and the display.

It will be apparent that a spurious pulse will produce a trip signal and for this reason it is desirable to include a trip signal detector which will produce an alarm only when two successive trip signals are produced.

The system may be protected against spurious trips due to failure of electrical components by employing three trip signal producing circuits and feeding all three outputs to a two from three logic circuit which will produce an alarm only when it receives at least two trip signals. This arrangement also provides for a failure of one of the circuits to produce a trip signal in response to overspeed and also facilitates testing each circuit whilst the system is "on-line" since the other two circuits are capable of producing an alarm.

Figure 2:
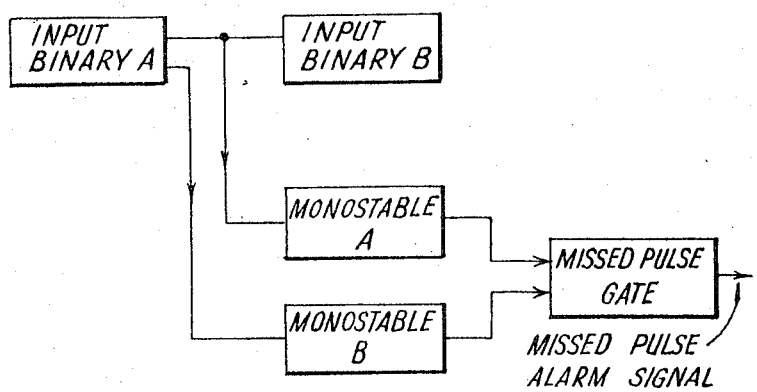
Figure 4:
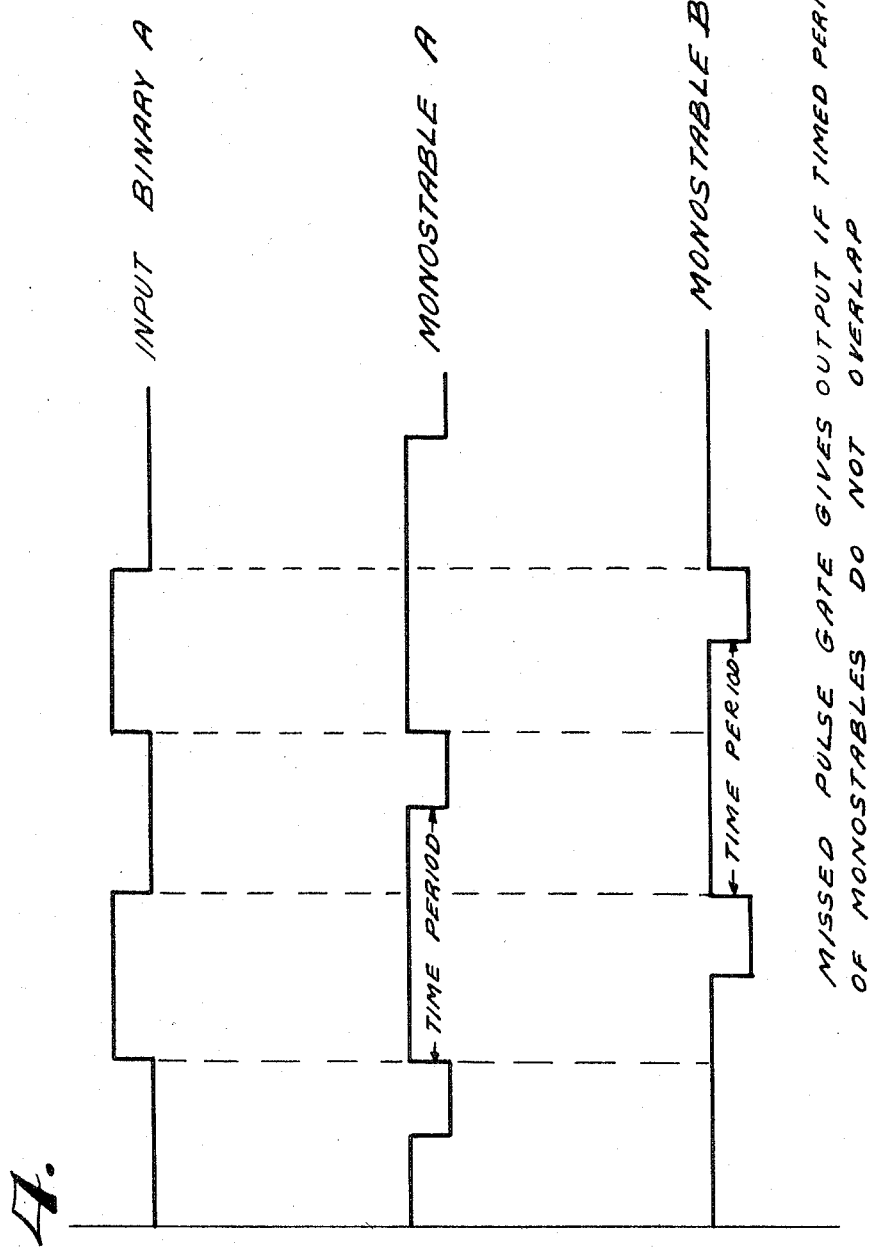

The system described above will not produce a trip signal if an input pulse is missing and in order that it should be "fail-safe" it must be able to detect missing pulses. For this purpose an additional circuit is employed as shown in FIGURE 2 of the accompanying drawing and wherein FIGURE 4 illustrates the waveforms occurring therin. The outputs from binary A are fed to monostables A and B and the outputs from the monostables gated together is a missed pulse gate. The monostables are set so that they remain unstable approximately for the duration of 1½ times the input pulse interval at normal running speed. Thus, if all input pulses are present, an output from at least one of the monostables will always be arriving at the missed pulse gate since they are activated by alternate pulses. When a pulse is missing, however, one of the monostables will not be actuated and after approximately half the input pulse period the other monostable will return to its passive state. The absence of a signal at the gate causes a missed pulse alarm to be produced.

This method of overspeed detection is also advantageous in its speed of reaction to overspeed conditions. One particular application of this method is for detecting overspeed of turbine shafts which drive compressors for chemical plants. The break-down of a compressor can cause the plant to be unproductive for a considerable period and it is therefore desirable that overspeed be detected in the shortest possible time in order to reduce the amount of damage which may occur in the turbine and compressor systems. When used in conjunction with the sensing device described in our co-pending application No. 31,782/65 a particularly advantageous overspeed detection system is afforded.

We claim:

1. A method of detecting the speed of a body moving with a recurring motion which comprises disposing a pulse-generating sensing means relative to the path of said body such that it can sense a particular sensible portion or series of sensible portions of the body at a particular position in said path, measuring the time interval between successive pulses produced by the sensing means as a result of sensing a sensible portion, comparing automatically the measured time interval with a standard time interval and identifying significant differences between said measured and standard time intervals.

2. A method according to claim 1 in which the pulses from the sensing means are used to actuate a clock pulse gate which permits clock pulses to be passed to a counting circuit.

3. A method according to claim 2 in which the clock pulses are counted in a multi-stage binary counter.

4. A method according to claim 2 in which the pulses from the sensing means are passed to a first bistable stage and the output from the first bistable stage is passed to a second bistable stage the output of which is used to actuate the clock pulse gate, whereby the clock pulse gate is actuated by alternate pulses from the sensing means.

5. A method according to claim 4 in which the alternate non-clock pulse gate- actuating pulses are utilised to reset the binary counter.

6. A method according to claim 5 in which the alternate pulses which reset the binary counter are also utilised to actuate a display indicating the state of the binary counter.

7. Apparatus for detecting the speed of a body moving with a recurring motion which comprises electrical connection means for connecting the apparatus to a pulse-generating sensing means, a clock pulse generator for providing clock pulses at a regular predetermined rate, a clock pulse gate circuit connected to said clock pulse generator, a counting device and resetting means for resetting the counter, the clock pulse gate circuit being connected to the sensing means so that pulses derived from said sensing means serve to open and close said gate whereby clock pulses are counted by the counter when the gate is open and the resetting means being operable by a pulse derived from said sensing means to cause the counter to be reset.

8. Apparatus according to claim 7 includes a first and a second bistable stage, the first bistable stage being operable by a pulse from the sensing means and the second bistable stage being operable by the first bistable stage, whereby the second bistable stage produces a pulse in response to alternate pulses from the sensing means, the output of the second bistable stage being connected to the clock pulse gate.

9. Apparatus according to claim 8 in which the outputs of both the first and second bistable stages are connected to a display gate which enables the state of the counting device to be displayed when it has completed a count of clock pulses between two successive pulses from the second bistable stage.

10. Apparatus according to claim 9 in which the outputs of the first and second bistable stages are also connected to the resetting means.

11. Apparatus according to claim 7 which includes a trip gate circuit connected to the counting device so that when the counting device has counted a predetermined number of pulses a pulse is received by the trip gate, the trip gate being connected also to receive pulses derived from the first bistable stage and being such that a trip signal is produced only when a pulse derived from the first bistable stage is received in the absence of a pulse from the counter.

12. Apparatus according to claim 11 in which the trip signal is utilized to actuate alarm means.

13. Apparatus according to claim 9 in which an output of the display gate is connected to the trip gate to provide the pulses derived from the first bistable stage.

14. Apparatus according to claim 12 in which a trip signal detector is interposed between the trip gate and the alarm which detector produces an alarm signal only after receiving a predetermined number of trip signals.

15. Apparatus according to claim 8 in which the two outputs from the first bistable stage are connected to first and second monostable circuits which can be preset to be unstable for approximately 1½ times the normal input pulse interval, the outputs of the monostable circuits being gated together whereby in the absence of a pulse from the sensing means an output will be obtained.

16. Apparatus according to claim 15 in which the gated output from the monostable circuits is connected to alarm means.

References Cited

UNITED STATES PATENTS 2,851,596  9/1958  Hilton _____ 324—78 X
3,127,768  4/1964  Mason _____ 324—70 X JOHN W. CALDWELL, Primary Examiner D. L. TRAFTON, Assistant Examiner U.S. Cl. X.R.
324—70